United States Patent [19]

Bowen

[11] 4,002,380
[45] Jan. 11, 1977

[54] ROLLER BEARING OF SUPERIOR RUN-OUT CHARACTERISTICS

[75] Inventor: Willard L. Bowen, Harwinton, Conn.

[73] Assignee: The Torrington Company, Torrington, Conn.

[22] Filed: Aug. 7, 1973

[21] Appl. No.: 386,318

Related U.S. Application Data

[63] Continuation of Ser. No. 287,010, Sept. 7, 1972, Pat. No. 3,765,071, which is a continuation-in-part of Ser. No. 39,767, May 22, 1970.

[52] U.S. Cl. .......................... 308/207 R; 308/202; 308/184 R; 308/215
[51] Int. Cl.² ........................................ F16C 13/00
[58] Field of Search .............. 308/207; 29/148.4 A

[56] References Cited

UNITED STATES PATENTS

| | | | |
|---|---|---|---|
| 1,652,766 | 12/1927 | Crouse | 308/184 |
| 2,859,076 | 11/1958 | Lorig | 308/202 |
| 3,410,618 | 11/1968 | Harris et al. | 308/212 |

FOREIGN PATENTS OR APPLICATIONS

| | | | |
|---|---|---|---|
| 418,088 | 2/1947 | Italy | 308/215 |

*Primary Examiner*—Robert R. Song
*Assistant Examiner*—Richard A. Bertsch
*Attorney, Agent, or Firm*—Diller, Brown, Ramik & Wight

[57] ABSTRACT

This disclosure relates to a roller bearing assembly which, when used to support a shaft for rotation, unexpectedly greatly reduces the run-out of the shaft even as compared to previous super precisions roller bearings. It has been discovered that if hollow rollers are substituted in a roller bearing for solid rollers and the hollow rollers are positioned between an outer race and a shaft or inner race in a preloaded condition with the allowable flexure of the rollers being at least slightly greater than the variations in radial spacing between the races, the run-out of a shaft axis so supported is greatly reduced. Further, the life of such a bearing is greatly extended. In addition, less precisions rollers may be utilized.

19 Claims, 9 Drawing Figures

U.S. Patent    Jan. 11, 1977    Sheet 1 of 2    4,002,380
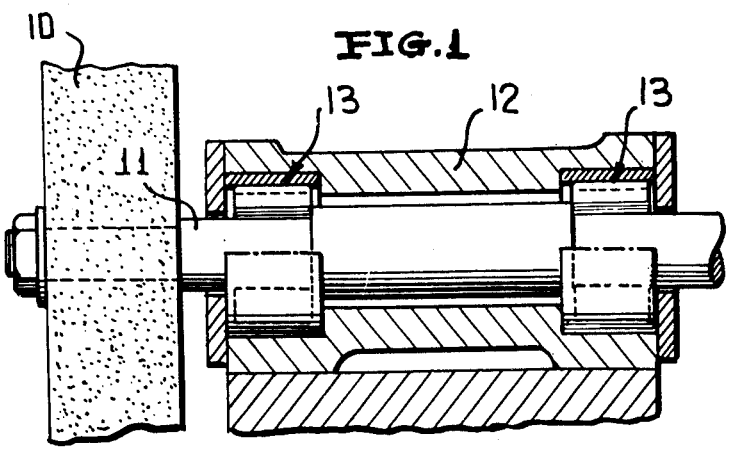
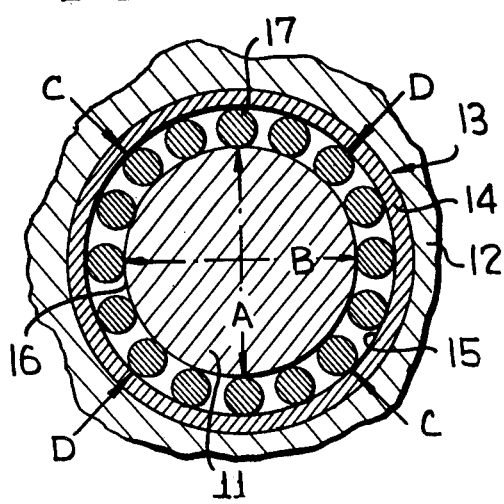
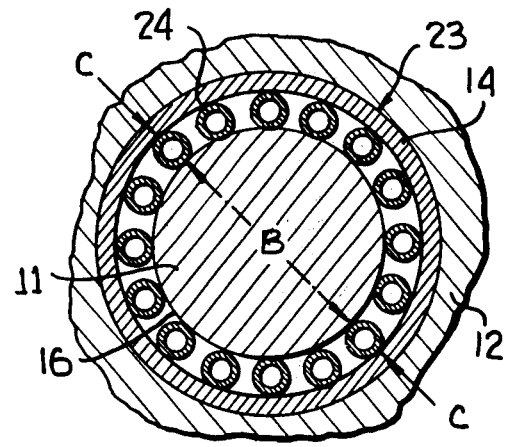
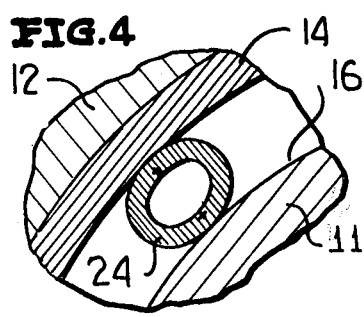
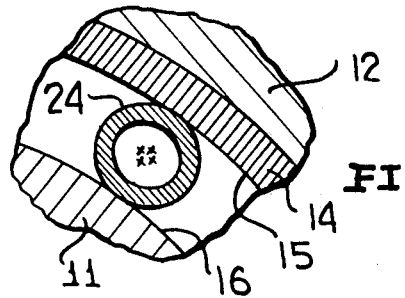
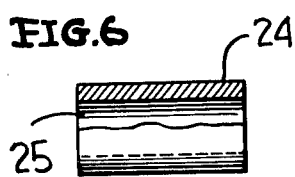
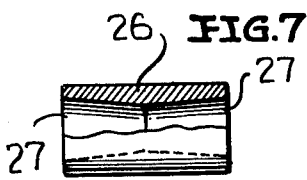

ROLLER BEARING OF SUPERIOR RUN-OUT CHARACTERISTICS

This application is a continuation of my copending application Ser. No. 287,010, filed Sept. 7, 1972, now Pat. No. 3,765,071 for METHOD OF FORMING A ROLLER BEARING OF SUPERIOR RUN-OUT CHARACTERISTICS, which is a continuation-in-part of my copending application Ser. No. 39,767 filed May 22, 1970, entitled ROLLER BEARING FOR SUPPORTING GRINDING WHEEL WITH GREAT DECREASE IN RUNOUT.

This invention relates in general to new and useful improvements in roller bearings, and more particularly to the provision of roller bearings for the precision supporting of shafts for rotation with a minimal runout.

BACKGROUND OF THE INVENTION

It has been known for some time to form rollers of roller bearings wherein the rollers are hollow. However, these rollers have primarily been hollow for lubrication purposes. In more recent years, roller bearings have been developed wherein the rollers are formed of resilient material. For example, the patent to Neidhart U.S. Pat. No. 2,842,410, granted July 8, 1958, suggests that the rollers may be formed of resilient material such as rubber and the like. However, the purpose of these rollers bearings was to provide a resilient bearing device having a self-dampening effect.

Several years ago, I began to experiment with the substitution of hollow rollers for normal solid rollers in roller bearings. It was my original thought at that time that I could satisfactorily make a roller bearing wherein the desired zero radial clearance was obtained. By providing rollers which were hollow and could flex or flatten out under a slight preload, firm contact could be made by the rollers with both races. This is virtually impossible to obtain with normal roller bearing components in view of the tolerances required in manufacture.

More recently, the patent to Harris, et all, U.S. Pat. No. 3,410,618, granted Nov. 12, 1968, issured. This patent also teaches the use of hollow rollers positioned in a preloaded condition between races of a roller bearing. However, Harris, et al. were primarily interested in anti-skid bearing which could operate at a very high speed and wherein by providing pressure contact of the rollers with the raceways, the resistance to skidding could be improved and an increase in bearing life could be obtained.

Knowing of a particular problem installation, namely the mounting of shafts for grinding wheels wherein runout is critical, experimental roller bearings for production grinding wheel shafts utilizing preloaded hollow rollers were made and installed. It was discovered that not only could the normal runout due to tolerance clearances within the roller bearing be eliminated, but also, it was discovered that runout of the shaft axis due to out of round conditions of the races of the bearing within manufacturing tolerances could be greatly reduced. This was unexpected.

It was further discovered that the quality of the finish of a hollow roller could be much less than that of a solid roller without materially affecting the runout of the axis of the shaft supported by the bearing assembly.

Hereinafter reference will be made to quality of bearings and bearing components. While in many fields there are but superficial standards, the bearing manufacturers, particularly in the U.S., have adopted a set of standards by which bearings are identified and through which bearings of different manufacturers are readily interchangeable in a known manner. These standards have been developed by The Anti-Friction Bearing Manufacturers' Association, Inc. and are known as the AFBMA standards. Basically, these standards are fixed. However, minor revisions are made from time to time wherein the requirements are made more stringent.

The AFBMA standards are divided into a plurality of sections, and it is believed that only Section Nos. 3, 4 and 5 apply to this invention. Attached hereto are Section Nos. 3, 4 and 5 of the AFBMA standards for either retention as a part of the patented file or as an available publication in the Patent Office Scientific Library.

The specific portions of the AFBMA standards are identified as follows:
Section No. 3, Revision No. 9, August, 1967
Section No. 4, Revision No. 6, October, 1966
Section No. 5, Revision No. 5, December, 1962

Section No. 3 of the AFBMA standards refers to the tolerance classification of roller bearings; pages 6, 7, 8 and 9. Bearing are classified as to their accuracy by the tolerance range to which the parts, i.e., (inner and outer race) are manufactured. Tolerance ranges are given in four classes:
ABEC-1 — has largest tolerance, least accuracy
ABEC-5 — less tolerance than 1
ABEC-7 — closer tolerance than 5
ABEC-9 — has least tolerance, greatest accuracy.

THE INVENTION

Basically speaking, this invention has to do with the substitution of hollow rollers in roller bearings supporting shafts for the normal solid rollers wherein the hollow rollers are mounted in a preloaded condition. Tests were run with respect to the grinding wheel support shaft of a production grinder wherein the runout was excessive and the bearing life too short even though super precision roller bearings were utilized. By replacing the solid rollers with hollow rollers which were installed under preloaded conditions, the runout of the shaft was greatly reduced, permitting much closer grinding tolerances. At the same time, it was found that the normal life expectancy of 2 to 3 months for the roller bearing was increased to at least on the order of 15 to 18 months.

Another feature of the invention is that a roller bearing wherein the raceways and rollers are manufactured to more liberal tolerance limits, if constructed in accordance with this invention, would not only have lesser runout, but also a longer expected life than super precision solid roller bearings of like size.

In accordance with this invention, it is necessary to select for the roller bearing a hollow roller which has sufficient flexibility not only to compensate for the maximum variation in radial spacing between the races, but also to be sufficiently stiff to carry the necessary load without excessive flexing that would allow the opposite rollers to lose contact with the raceways. When these rollers are installed under a preloaded condition, that is one wherein the rollers are in pressure contact with the races under all normal operating conditions of the bearing, there can, of course, be no runout due to "play" within the bearing. At the same time, because the rollers can flex under load, the expected runout of the shaft due to either the out of round condition of the shaft (or its associated race) or the outer race, is greatly reduced because as a wedging action occurs in areas of minumum spacing, in lieu of the shaft being shifted offcenter, the wedged roller collapses or flexes and either no or minimal transverse shifting of the shaft occurs.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a fragmentary sectional view taken through a typical bearing assembly and mounting for a shaft of a grinding wheel of a production grinder.

FIG. 2 is an enlarged transverse sectional view through a conventional type of roller bearing schematically showing the deficiencies thereof.

FIG. 3 is a view similar to FIG. 2 showing a like roller bearing but wherein hollow rollers have been substituted for solid rollers.

FIG. 4 is a fragmentary schematic view showing the flexing of a roller when positioned at the point of minimum radial spacing between the raceways.

FIG. 5 is a fragmentary view similar to FIG. 4 and shows a roller positioned at a point of maximum radial spacing.

FIG. 6 is an elevational view on a large scale and with parts broken away and shown in section of a typical hollow roller in accordance with this invention.

FIG. 7 is a view similar to FIG. 6 and shows a modified form of roller construction.

Figure 8:
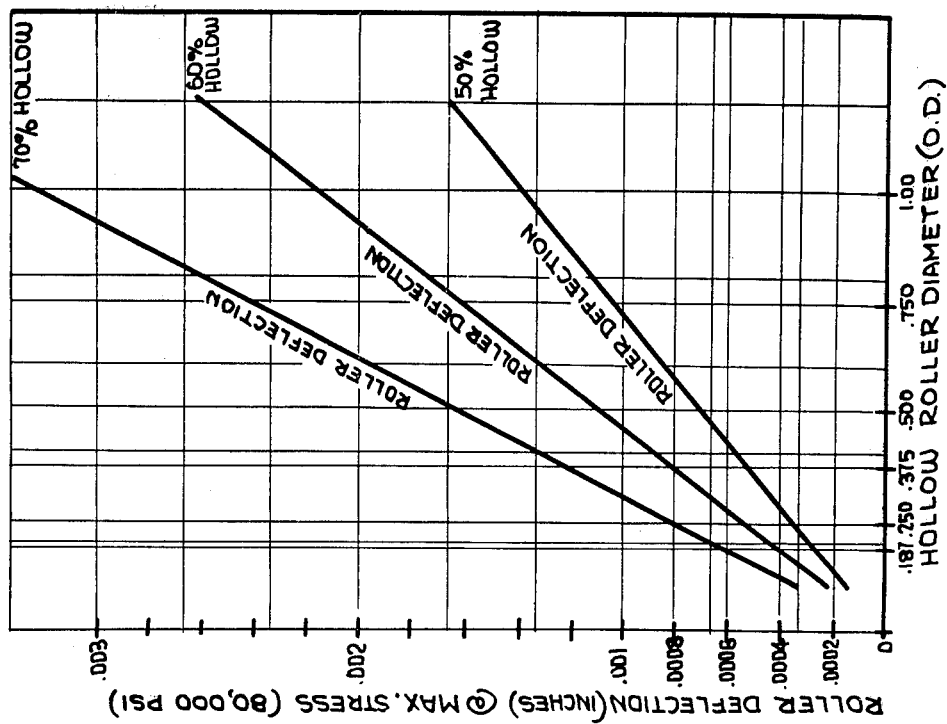
FIG. 8 is a chart plotting hollow roller diameter against roller deflection.

Referring now to FIG. 1 in particular, it will be seen that there is illustrated schematically a typical type of support assembly for a grinding wheel 10 of a production grinder. The grinding wheel 10 is carried by a shaft 11 which, in turn, is rotatably journalled within a support or housing 12 by two axially spaced roller bearing assemblies 13. While the roller bearing assemblies have only been schematically illustrated, and have been shown as single row bearings, it is to be understood that the roller bearing assemblies may have double or triple rows of rollers and may be provided with cages. It is also to be understood that suitable means may be provided for pressure lubricating the bearing assemblies 13 so as to assure a continued supply of lubricant at thhe desired temperature. In addition, while the mounting of the shaft 11 has been illustrated as a cantilever mounting, it is to be understood that it is permissible for the grinding wheel 10 to be mounted intermediate the ends of the shaft 11 and that there be roller bearing assemblies supporting the shaft 11 on opposite sides of the grinding wheel 10.

At this time it is pointed out that while this invention is in no way restricted to a roller bearing for the supporting shaft of a grinding wheel of a production grinder, the mounting of a grinding wheel support shaft has been illustrated as a typical environment of the invention in that a grinding wheel is a typical example of a machine element which must be mounted for rotation with a minimum of runout. It will be understandable that any runout in a grinding wheel produces an undesirable effect during a grinding operation and interferes with the grinding of a workpiece both to the desired size and the desired finish.

While many grinder manufacturers do employ roller bearings in the mounting of the grinding wheel support shaft, because of the runout problem, other grinder manufacturers still utilize a bushing type bearing in an attempt to minimize runout.

It is well known that production grinders are utilized in the manufacture of bearing components. It is also well known that bearing components are elements which must be mass produced with a minimal permissive tolerance. At the present, there is in use centerless grinders wherein the grinding wheel 10 has a width on the order of 8 inches and a diameter on the order of 14 inches. The support shaft 11 for the grinding wheel 10 of the centerless grinder is supported within its support housing 12 by super precision roller bearings which incorporate solid rollers. The roller bearings, being super precision bearings, have the components thereof machined to tolerances which allow a minimal permissive variation. The runout of the grinding wheel, while it is held as low as possible and permits a satisfactory grinding operation, should be reduced if at all possible. Furthermore, the average life of the bearing assemblies mounting the support shaft of the grinding wheel is two to three months.

The reasons for runout of the shaft 11 will be apparent from the schematic showing of FIG. 2. The roller bearing assembly 13 is illustrated as including an outer race 14 having an inner surface defining an outer raceway 15. The shaft 11 is illustrated as having an outer surface defining an outer raceway 16 although the shaft 11, of course, may be provided with a separate inner race with the outer surface of the inner race defining the outer raceway 16. The shaft 11 is mounted for rotation within the outer race 14 by means of a plurality of rollers 17 which may either be arranged in a full complement manner or may be separated by means of a suitable cage.

Although the illustrated bearing assembly 13 is a super precision roller bearing, it is to be understood that the raceway 16 will have a minor diameter A and a major diameter B. In a like manner, although the raceway 15 is precision ground, it will have a minor diameter C and a major diameter D. It is to be understood that when the major diameter B of the inner raceway 16 is aligned with the minor diameter C of the outer raceway 15, a minimum radial spacing between the raceways 15 and 16 will exist. In a like manner, when the minor diameter A of the inner raceway 16 becomes aligned with the maximum diameter D of the outer raceway 15, a maximum radial spacing between the raceways 15 and 16 will exist. Assuming that there is no diametral clearance in the bearing, since the shaft 11 will gyrate about its true center by the difference in radial spacing, this will be the minimum permissive runout of the bearing assembly 13.

Even in the super precision bearing there must be a tolerance in the roller diameter even if the tolerance is measured in the ten thousandths of an inch. As a result, there is a diametral clearance in all roller bearings, even super precision bearings. In view of this, even with super precision bearings, with a shaft diameter on the order of 3.0 inch, the runout of the shaft will be on the order of 0.003 inch to 0.0012 inch.

Referring now to FIG. 3, it will be seen that the bearing assembly 13 of FIG. 2 has been modified and is now identified as bearing assembly 23. The bearing assembly 23 may differ from the bearing assembly 13 only in that the solid rollers 17 of the bearing assembly 13 have been replaced by hollow rollers 24. The bearing assembly 23 may still include the same outer race 14 and the rollers 24 may directly engage the raceway 16 of the shaft 11 in the same manner as illustrated in FIG. 2. Of course, if desired, an inner race may be carried by the shaft 11 with the outer surface of the inner race defining the raceway 16.

Experiments have been carried out with roller hollowness bearing from 50% to 81%. Hollowness of a roller is defined as the diameter of the hole in percent of the outside diameter of the roller. Generally speaking, rollers having over 70% hollowness are too flexible to carry a useful load although they may be used in cooperation with rollers of less hollowness in the same bearing. For general bearing usage, the most advantageous range of hollowness is 55% to 65% as indicated by experimentation. However, rollers for special purpose bearings may have a useful hollowness range from 50% to 80%, depending upon the application requirements.

Figure 9:
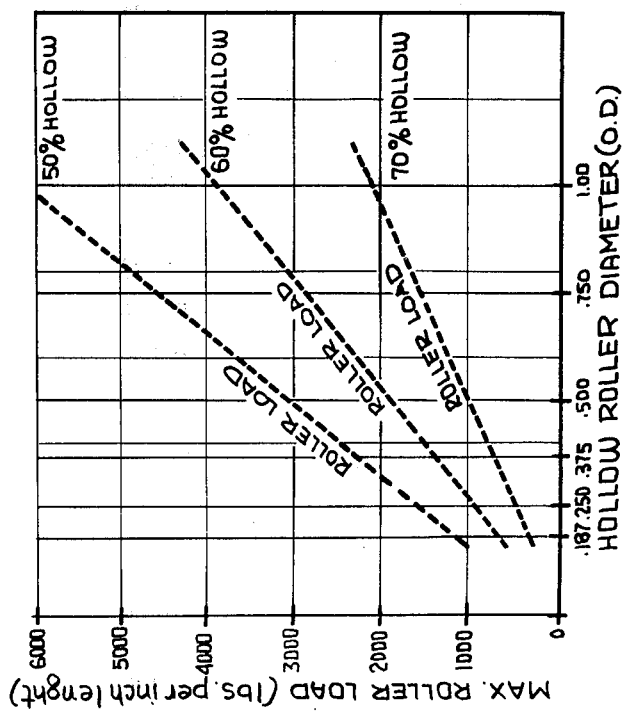
FIG. 9 is a chart plotting hollow roller diameter against maximum roller load.

As is clearly shown in the deflection chart of FIG. 8, the greater the hollowness of the roller, the greater the deflection for a given load. In a converse manner, as is shown in the chart of FIG. 9, the greater the hollowness, the lesser the load supporting ability of the roller.

It will be readily apparent that in determining the hollowness of the roller to be utilized in the bearing assembly, it is necessary tht the roller have suitable deflection characteristics which will permit the roller to remain in intimate contact with the raceways 15 and 16 at all times. Therefore, the allowable deflection of the roller must be at least equal to the preload deflection of the roller plus the maximum variation in radial spacing between the raceways 15 and 16. At the same time, the roller, of course, must be able to support the load.

It has been found that with the proper utilization of a hollow roller, the shaft runout may be reduced between 1/5 and 1/10 of a super precision roller bearing. At the same time, the life expectancy of the bearing may be increased on the order of 5 to 6 times.

There has been described above a centerless grinder shaft installation wherein the roller bearings must be replaced every 2 to 3 months. Utilizing hollow rollers in the same installtion, the life of the bearings has been between 15 to 18 months.

There has also been found that when a roller or bearing is provided with hollow rollers, it is not necessary that the rollers be manufactured to the precision required with respect to normal solid rollers. In addition, the surface finish of a hollow roller may be as much as 5 to 6 points higher on the micro scale above the surface finish of a normal solid roller. As an example of this, a spindle shaft having a diameter on the order of 3.0 inches at a runout of only 10 millionths of an inch when supported by a hollow roller bearing assembly of the type shown in FIG. 3 with the rollers having 0.00005 inch diameter tolerance.

Referring now to FIG. 4, it will be seen that when the maximum shaft diameter B is aligned with the minimum outer raceway diameter C, the radial spacing between the raceways 15 and 16 is at a minimum, and the rollers are materially deflected although the deflection of the rollers 24 in FIG. 4 is exaggerated.

It is also to be understood that the minor shaft diameter A will become aligned with the maximum raceway diameter D with the result that the radial clearance between the raceways 15 and 16 will become maximum. This condition is shown in FIG. 5. It is to be noted, however, that due to the preloading of the rollers 24, the roller disposed within this maximum radial spacing is still deflected to an out of round condition although the deflection is not as great. Once again the deflection has been exaggerated.

It is to be understood that while there is a direct tendency for a runout of the shaft 11 due to an out of roundness of either or both the shaft 11 and the raceway 15, which runout cannot be compensated for by solid rollers, such as the rollers 17, the hollow rollers 24 actually do compensate for the normal tendency of the shaft to rotate eccentric to its axis with the result that the tendency for shaft runout is compensated by the flexure of the rollers 24 as the radial spacing between the raceways 15 and 16 varies during the rotation of the shaft 11.

Although increase in bearing life may be attributed in some degree to the anti-skid characteristics of the hollow rollers, as specifically discussed in the Harris, et al. U.S. Pat. No. 3,410,618, it has been found that the increased bearing life is due to other factors. Because the hollow roller, in usage, does not have a cylindrical surface as the case of a solid roller, but is flattened between the two race ways, the surface area of a hollow roller opposing a raceway is greatly increased over the corresponding surface area of a solid roller, with the result that a greater reduced tendency of a hollow roller breaking through the customary oil film disposed between the rollers and the raceways. Accordingly, metal-to-metal contact less frequently occurs.

A further advantage of a hollow roller over a solid roller is that the softness or flexure of the hollow roller allows it to cushion shock load and accommodate dirt or foreign matter in the bearing with much less surface stress. At the same time, the cushioning effect also practically eliminates the rupturing of lubricating oil films from shock loads.

Normally the hollow roller 24 will have a cylindrical bore 25 therethrough, as is specifically illustrated in FIG. 6. However, under certain conditions, it may be desirable to modify the bore within the hollow roller. Reference is, accordingly, made to FIG. 7 wherein there is illustrated a modified form of hollow roller which is identified by the numeral 26. The hollow roller 26 is provided with two tapered bores 27 which generally intersect at the axial center of the roller. Thus, the roller 26 has a maximum wall thickness at the center and minimum wall thickness at the two ends thereof. Also, roller load capacity will be increased without decreasing fatigue life. The thinner wall cross-section at the ends of the roller permit greater flexure without excessive stress at the end of the rollers.

It is to be understood that in addition to the raceways having runout, the raceways also have a minor degree of taper. Therefore, the radial spacing between raceways of a roller bearing not only vary circumferentially as the shaft rotates, but also varies axially. By forming the hollow roller 26 with tapering bores 27, it will be seen that the hollow roller can flex more at the ends thereof to compensate for raceway taper and at the same time the central portion thereof will be of sufficient thickness so as to provide the necessary support.

In accordance with the foregoing, and with particular reference to the AFBMA standards, it is pointed out that the hollow roller bearing formed in accordance with this invention does produce an assembled bearing having greater accuracy than the parts (outer race, inner race and rollers). This would be impossible to do with regular solid roller bearings in which every inaccuracy is reflected in the assembled product, and these inaccuracies, plus the needed running clearance, are accumulative. Thus, a solid roller bearing cannot be better than the parts from which it is made.

Notwithstanding the foregoing, it has been discovered that the use of hollow rollers overcomes many of the inaccuracy problems by the ability of the flexible roller to absorb and average out raceway inaccuracies such as out-of-round, radial run-out and surface defects. The advantages obtained with the hollow roller bearing of this invention can be readily shown by reference to the AFBMA standards referred to above.

Considering a 100mm bearing with reference to the AFBMA standards:

A grade ABEC-5 inner race has a bore tolerance of +0; −.0003 inch and a maximum allowed runout between outside and inside surface of 0.00025 inch.

A grade ABEC-5 outer race has an outside diameter tolerance of +0; −0.0003 inch and a maximum permissible radial runout of 0.0004 inch.

A roller bearing assembled to ABEC-5 tolerances cannot be expected to have a radial run out better than 0.0004 inch assuming one of the races is stationary. Also, when such a bearing is provided with solid rollers and has the normal running clearance of 0.001 inch, which must be added to this minimum run-out of 0.0004 inch, the normal run-out of a grade ABEC-5 bearing is 0.0014 inch.

However, when a bearing in accordance with this invention is formed and whose races are manufactured to the same above ABEC-5 tolerances, it will have much less run-out. The hollow roller bearing has two excellent advantages over the conventional solid roller bearing.

First, the hollow roller bearing is preloaded; that is the rollers have an interference fit between outer and inner races and retain this preload under all operating conditions. In view of this, immediately the 0.001 inch running clearance required by solid roller bearings is eliminated. This, of course, is also an expected result of the bearing disclosed in the aforementioned patent to Harris, et al., U.S. Pat. No. 3,410,618.

The discovered and distinct advantage of the hollow roller bearing over its solid roller counterpart is the ability of the rollers to flex while rotating and absorb the out-of-round condition of the rotating raceway, which raceway is normally the inner race. Thus, an inner race having a radial run-out of 0.00025 inch (ABEC-5 tolerance) shows that at most only one half (0.00012 inch) deviation as the rollers will absorb at least half and often better of the run-out. In actual practice, it has been found that the run-out is reduced to ¼ or 1/5 that normally expected by the manufacturing tolerances used with reference to ABEC-5 grade components. Bearings in accordance with this invention have been made wherein the races are ground to 0.0004 inch tolerance and yet the shaft run-out of the assembled bearing was only 0.00002 inch total indicator reading for a shaft deviation of only 10 millionths (0.000010).

In accordance with the AFBMA standards, a grade ABEC-9 100mm bearing has a maximum permissible run-out of 0.0001 inch. Bearings formed in accordance with this invention utilizing all ABEC-5 grade bearing components will provide equal or less run-out than the allowable run-out for an ABEC-9 bearing, usually 0.000050 radial deviation.

In view of the foregoing, it will be readily apparent that even when one takes into consideration the elimination of the radial clearance required in a roller bearing utilizing solid rollers, as would occur when one utilized hollow rollers in a preloaded condition, the results are unexpected. That is, the results are better than that which would be expected when one calculates the minimum possible run-out.

No attempt will be made here to specifically indicate respective ranges of preloading, hollowness, roller diameter to shaft ratios, etc. It is to be understood, however, that the preloading of the rollers should always be such as to provide for a free load roller flexure at least equal to the maximum variation in roller diameter. In addition, the total allowable flexure of the roller must be at least as great as the preload flexure plus the variation in radial spacing between the raceways. In addition, consideration should be given to the flexure of the roller which will occur due to operating loads placed thereon. It will be readily apparent that roller hollowness will be a mere question of bearing engineering design which requires no further discussion here.

Although only a preferred embodiment of the discovery has been specifically illustrated and described herein, it is to be understood that the invention is not restricted to the supporting of shaft or spindles for grinding wheels, but may be equally applied to all shaft installations wherein run-out is a critical factor. In a like manner, although only two roller configurations have been specifically illustrated and described, it is to be understood that it is feasible for one to use other roller configurations without departing from the spirit and scope of this invention, as defined in the appended claims.

I claim:

1. A roller bearing of superior runout characteristics for the dimensional control of the components thereof in accordance with an acceptable standard of grading bearings and bearing components wherein the quality of bearings and bearing components are graded in a predetermined sequence, said roller bearing comprising companion bearing races of known inferior grade in accordance with said standard, and hollow metal rollers of a known grade, said hollow rollers having a diameter greater than the maximum spacing between said races with said rollers being in a preloaded condition between said races, and said bearing having the runout characteristics of a bearing of a grade in accordance with said standard superior to that required for a bearing utilizing races of said known inferior grade and solid rollers of said known grade without clearance between each roller and said races.

2. The bearing of claim 1 wherein the runout of said bearing is less than the permissible runout for one only of said races according to the standard of the grade of the selected race.

3. The bearing of claim 1 wherein the runout of said bearing is less than one half the combined permissible runout of said races according to the standard of the grade of selected races.

4. The bearing of claim 1 wherein the runout of said bearing is less than one quarter the combined permissible runout of said races according to the standard of the grade of selected races.

5. The bearing of claim 1 wherein said rollers and races are of the same grade.

6. The bearing of claim 1 wherein said acceptable standards are the known AFBMA standards and the grades thereof are numerical grades with grade 1 bearings and components having largest tolerance and least accuracy and grade 9 bearings and components having least tolerance and greatest accuracy.

7. The bearing of claim 6 wherein the selected races are of grade 5 tolerances, the selected rollers are of at least grade 5 tolerances, and the runout of the resultant bearing is within the allowance tolerances for a grade 9 bearing.

8. The bearing of claim 7 wherein said rollers are of grade 5 tolerances.

9. The bearing of claim 1 wherein said bearing races having surfaces generated substantially by a straight line rotated about an axis.

10. A roller bearing assembly particularly adapted for supporting a shaft for rotation with minimal deviation from a predetermined axis, said bearing assembly comprising a shaft having a race surface carried thereby and a substantially concentrically arranged race surface, said race surfaces being manufactured within conventionally acceptable tolerance limits and having a radial spacing therebetween varying circumferentially wherein if solid rollers were disposed between said race surfaces said shaft would rotate with runout, and deflectable hollow metal rollers positioned between said race surfaces with all of said rollers being constantly radially preloaded and in pressure contact with said race surfaces and said rollers being the sole bearing means maintaining the relationship between said race surfaces, said rollers each having a diameter at least as great as the maximum radial clearance between said race surfaces, and each roller having an allowable deflection at least as great as the maximum variance in radial spacing between said race surfaces with said hollow rollers being means for automatically compensating for manufacturing dimensional variations in the roller bearing assembly and providing for rotation of said shaft substantially without runout.

11. The roller bearing of claim 10 wherein the shaft runout is on the order of 1/5 to 1/10 of the shaft runout with a like size super precision roller bearing incorporating solid rollers.

12. The roller bearing of claim 10 wherein at least one of said race surfaces is machined to no better than normal bearing tolerances and the flexure of said hollow rollers restricts shaft runout to one less than that of a super precision solid roller bearing of the same size as said roller bearing assembly.

13. The roller bearing of claim 12 wherein both of said race surfaces are machined to normal bearing tolerances.

14. The roller bearing of claim 10 wherein each of said hollow rollers is loaded to approximately one-half the normal loading of a solid roller in a like size roller bearing with a resultant less oil film loading.

15. The roller bearing of claim 10 wherein each of said hollow rollers has a surface finish as much as 5 to 6 points higher on the micro scale above the surface finish of a normal solid roller without adversely affecting the operational life of said roller bearing.

16. The roller bearing of claim 10 wherein each hollow roller has a double tapered bore of a minimum diameter generally at the axial center thereof to facilitate progressive loading and bending of said rollers.

17. A bearing as of claim 10, wherein the axis of rotation of a shaft is reduced to 1/5 or less that of the out-of-round accuracy of said race surfaces from a true circle or the out-of round variation caused by the combined inaccuracy of revolution of both race surfaces.

18. A machine element installation comprising a large machine element which must be supported for rotation with a minimum of runout, a shaft supporting said large machine element, and roller bearings supporting said shaft for rotation, the runout of said shaft axis being materially less than heretofore possible with roller bearings and said roller bearing having a longer than normal life by said roller bearings being improved solely through the use of hollow rollers in lieu of conventionally utilized solid rollers with said hollow rollers being deflected under a preloading and in constant pressure contact with said shaft under all operating conditions.

19. The roller bearing of claim 18 wherein each of said hollow rollers is loaded to approximately one-half the normal loading of a solid roller in a like size roller bearing with a resultant less oil film loading.

* * * * *